United States Patent [19]

Yanai

[11] 4,261,780
[45] Apr. 14, 1981

[54] METHOD OF BUNDLING BAGS BY HEAT-ADHESION

[75] Inventor: Takeo Yanai, Koshigaya, Japan

[73] Assignee: Nippon Flute Co., Inc., Saitama, Japan

[21] Appl. No.: 70,094

[22] Filed: Aug. 27, 1979

[30] Foreign Application Priority Data

Feb. 14, 1979 [JP] Japan .................................. 54-15683

[51] Int. Cl.³ ............................................... B32B 3/00
[52] U.S. Cl. .................................... 156/251; 156/252; 156/513
[58] Field of Search .................. 11/1 B; 156/251, 252, 156/305, 513

[56] References Cited

U.S. PATENT DOCUMENTS

| | | | |
|---|---|---|---|
| 801,507 | 10/1905 | Blanchard | 11/1 B |
| 2,232,640 | 2/1941 | Schwartzman | 11/1 B |
| 2,973,797 | 3/1961 | Sylvester | 156/251 |

*Primary Examiner*—David A. Simmons
*Attorney, Agent, or Firm*—James E. Nilles

[57] ABSTRACT

A method of bundling bags by heat-adhesion comprising the steps of: making holes in bags made of heat-adhesive material; inserting guide rods into the holes of the bags to stack the bags at the correct position; pressing a heated thermal cutter against one end surface of the stacked bags to bond them together by heat-adhesion. Said guide rods are moved in synchronism with the feeding of the bag so as to be inserted into the holes formed in the bag. Said guide rods are inserted vertically slidable through bag holding cylinders having vertical grooves, the guide rods are provided at their top ends with arrows, those rear ends of the arrows that project from the side of the guide rods are hooked on the peripheral edges of the holes of the bag, and as the guide rods are lowered, the rear ends of the arrows are slid downwardly through the grooves of the bag holding cylinders to force the bag down the cylinders.

4 Claims, 3 Drawing Figures

METHOD OF BUNDLING BAGS BY HEAT-ADHESION

BACKGROUND OF THE INVENTION

This invention relates to a method of bundling bags such as unfinished shopping bags by heat-adhesion.

Conventional shopping bags are formed of synthetic resin tube by folding both sides of the synthetic resin tube, sealing the bottom and top of the bag by heat, and cutting off the central portion of the top to form a grip portion and opening.

To produce such shopping bags, the following processes are followed. Both sides of the synthetic resin tube are folded in V-shape to make the tube a flat sheet. The strip of the sheet is sealed by heat at predetermined intervals and cut at the sealed portions. The cut bags are stacked and bundled, and delivered to customers such as department stores where the top portions of the bags are cut off and removed to form a grip portion and opening. A number of stacked bags are bundled to facilitate storage and transportation and also to make it possible for the customers to cut off the top portion of as many bags as possible in one cutting operation. In binding the bags into a bundle, it is necessary to have the stacked bags bear tightly on each other to that they will not slip from each other. This is important for the cutting and removal of the top portion of the bags. For this reason, a method of bonding the bags by heat-adhesion has been used. The bonded portions of the bags are later removed during the grip forming process. Conventionally, there are two kinds of heat-adhesion process.

One method is to pierce the heated iron rod through the hole of the stacked bags to bond the bags together at the periphery of the hole by the heat of the iron rod. In this method, however, the temperature of the iron rod becomes low as the iron rod passes through the holes of the stacked bags and therefore no more than 50 bags can be bonded together. Another method is to pierce heated needles through the bags successively and bond them together by the heat of the needles. This method also has a disadvantage that when the number of bags stacked increases, they do not contact tightly, and no more than 50 bags can be bonded together.

SUMMARY OF THE INVENTION

An object of the present invention is to provide a method of bundling bags by heat-adhesion by which conventional drawbacks can be overcome, said method comprising the steps of: making holes through the bags made of heat-adhesive material; inserting guide rods into the holes; guiding the bags successively along the guide rods; stacking a number of bags in a correct position; and thereafter pressing a heated thermal cutter against one end surface of the stacked bags to bond them together by the heat of the cutter.

Other objects and advantages of this invention will become apparent from the following description and drawings.

DESCRIPTION OF THE PREFERRED EMBODIMENT

Figure 1:
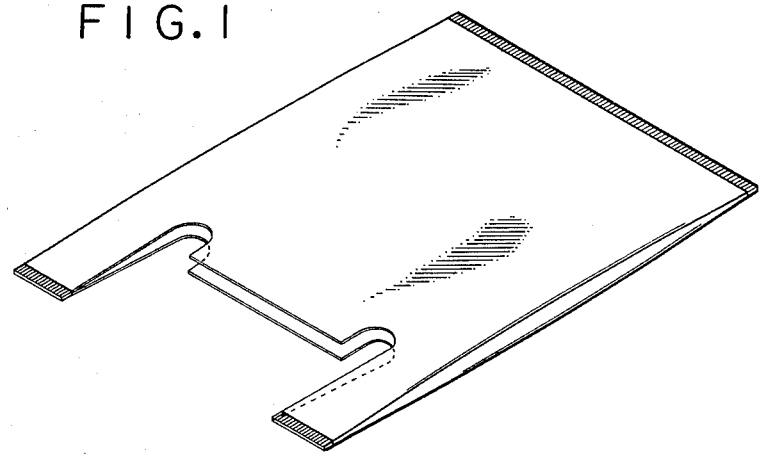
FIG. 1 is a perspective view of one example of a shopping bag.
Figure 3:
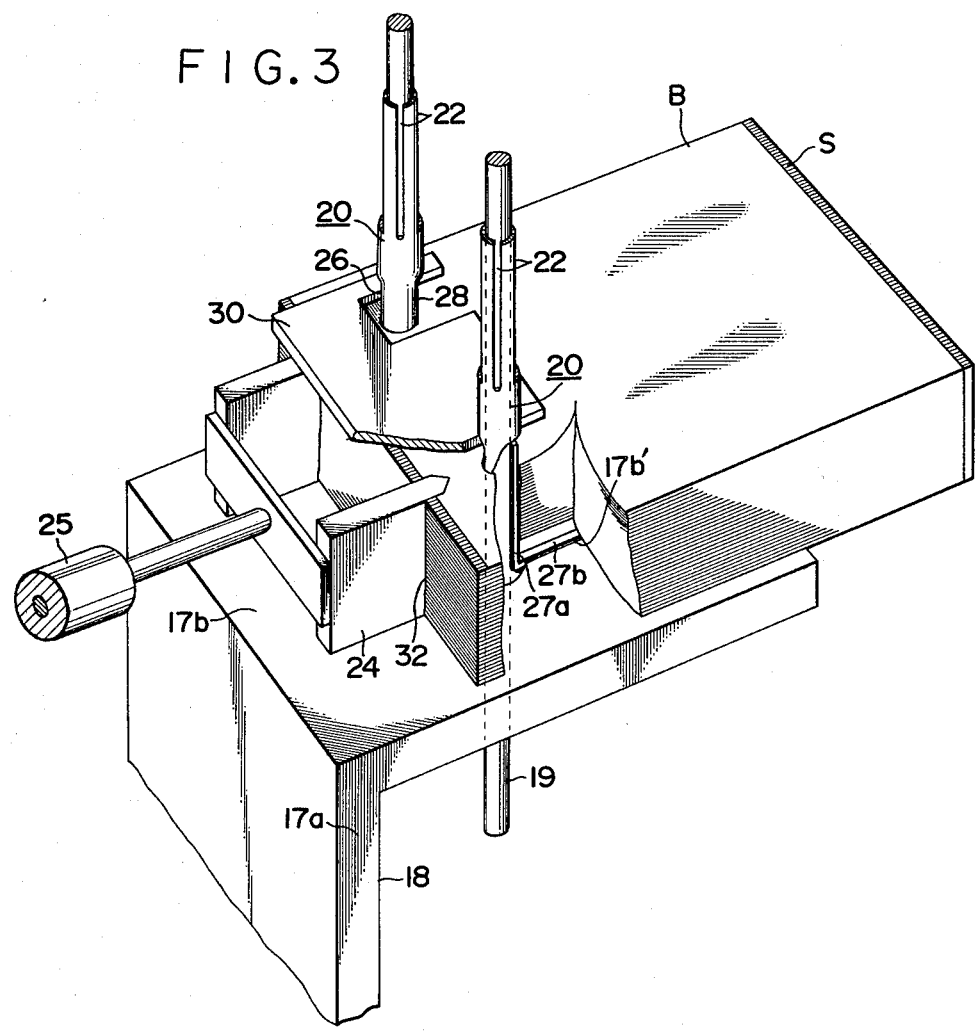
FIG. 3 is a perspective view, partially broken away, of the main portion of the apparatus illustrated in FIG. 2.
Figure 2:
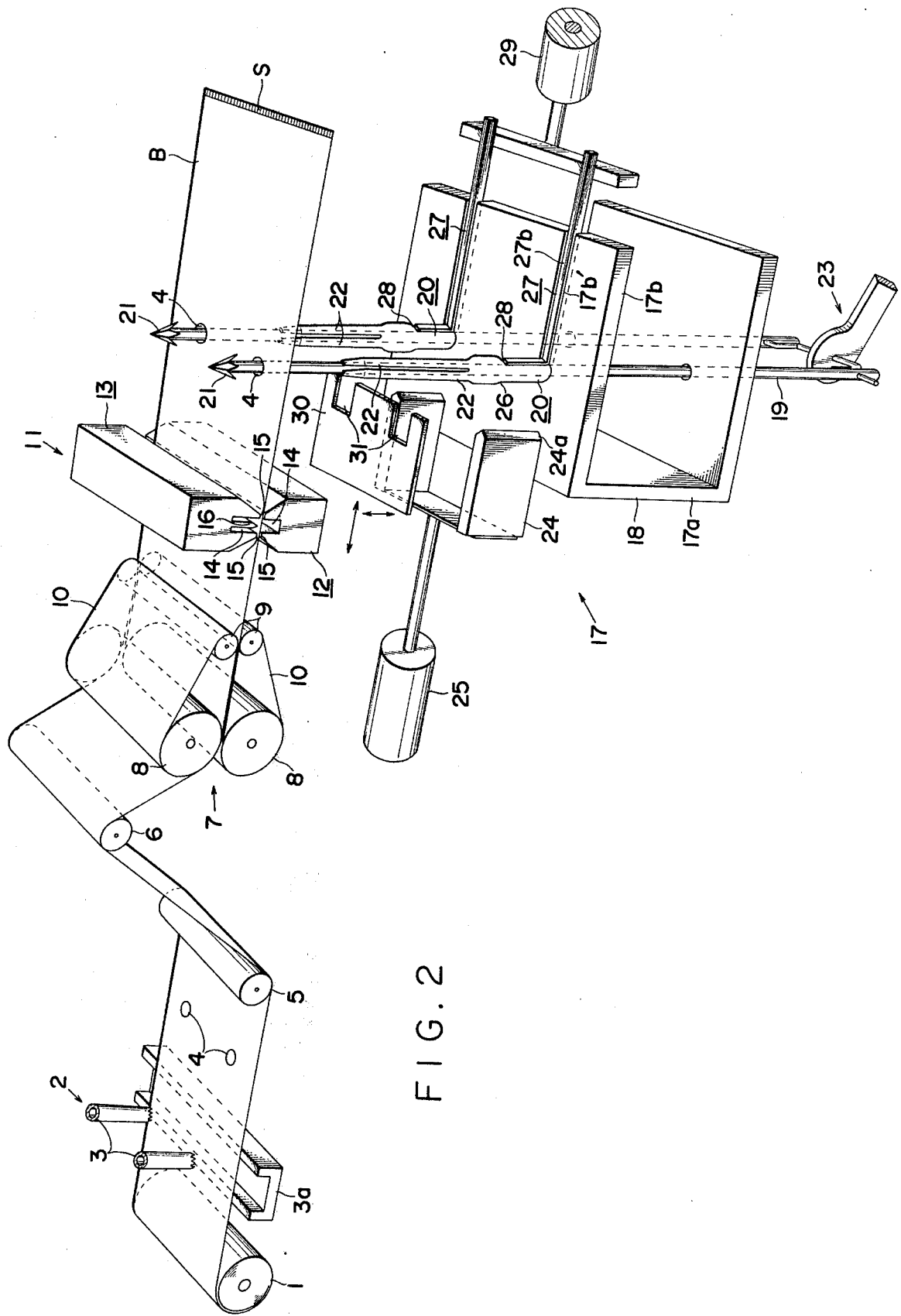
FIG. 2 is a perspective view of an apparatus used for a bag bundling process according to the present invention.

Reference numeral 1 represents a rolled sheet made of thermoplastic resins such as polyethylene which becomes adhesive when subjected to heat. The rolled sheet 1 is a thermoplastic resin tube flattened and rolled with its sides folded inwardly in a V-shape. The sheet 1 is unwound and fed through a pair of perforators 2 that are spaced from each other in the direction of the width of the sheet 1. The perforators 2 consist of perforatng spindles 3 disposed above the sheet 1 and having serration on the bottom thereof, and a supporter 3a disposed under the sheet 1. The perforators punch out successive pair of holes 4 through the sheet 1 at predetermined intervals.

The sheet 1 with holes 4 is then led to a feeder device 7 through guide rolls 5 and 6. The feeder device 7 comprises a pair of large diameter rolls 8 and a pair of small diameter rolls 9, these pairs being disposed vertically symmetrical with respect to the sheet 1. The large and small rolls are interconnected with a belt 10, and the sheet 1 is held between these belts 10 and advanced from between the front small rolls 9 by driving the large rolls 8.

The sheet 1 is further sent to a bag making device 11 where it undergoes cutting and heat-bonding processes to form a bag B. The bag making device 11 consists of a stationary supporter 12 disposed under the sheet 1 and a vertically movable presser 13 disposed above the sheet 1. Both the stationary supporter 12 and the presser 13 have trapezoidal cross sections and bear against each other at their top surfaces which extend over the whole width of the sheet 1.

At the centers of the contacting top portions of the stationary supporter 12 and the presser 13 are formed depressed portions 14 that face each other extending over the whole width of the sheet 1. The top portions on both sides of the depressed portion 14 contain a heat source to form heat-bonding portions 15. Attached to the depressed portion 14 of the presser 13 is a cutter 16 which extends over the whole length of the depressed portion 14 and projects toward the sheet 1. In a bag making process, the sheet 1 is advanced downstream beyond the bag making device 11 by as much distance as a bag-length so that the holes 4 are located downstream of the heat-bonding portions 15. Then, the presser 13 is lowered to simultaneously seal by heat the bottom edge of the bag B and the top edge of the succeeding bag B, thereby forming sealed portions S which are cut by the cutter 16 to separate the bag B downstream of the bag making device 11 from the sheet 1. This process is repeated.

The cut bag B is then introduced to a heat-bonding and stacking device 17 which stacks and bonds together 100 bags B. The heat-bonding and stacking device 17 has a fixed frame 18 which comprises a vertical wall 17a and horizontal support walls 17b extending horizontally from the upper and lower ends of the vertical wall 17a. The horizontal support walls 17b have a pair of guide rods 19 vertically piercing and slidable therethrough, with the distance between the guide rods being the same as that between the holes 4 on the bag B. The upper portions of the guide rods 19 extend vertically slidable through bag holding cylinders 20 secured to the upper support wall 17b, the upper ends of the cylinders 20 being tapered off. The upper ends of the guide rods 19 are projected upward from the bag support cylinders 20 and provided with an arrow 21. The arrow 21 consists of two angle pieces combined crosswise with the rear ends projected from the side of the guide rod 19 and with the center top pointed sharply. The upper portion of each bag holding cylinder 20 has vertically extending grooves 22 formed in such a manner as to receive the projecting rear ends of the arrow 21 so that the arrow 21 of the guide rod 19 is vertically movable relative to the bag holding cylinder 20. The lower ends of the pair of guide rods 19 are connected to a driving mechanism 23. The arrows 21 are located just below the holes 4 of the sheet 1 fed downstream of the bag making device. The guide rods 19 are raised in synchronism with the advancement of the sheet 1 to pierce the sheet 1 through the holes 4. The guide rods 19 are then lowered to hook the bag B with the projected rear ends of the arrows 21. As the bag B is lowered together with the arrows 21, the bag holding cylinders 20 are forced into the holes 4 of the bag B whereby the bag B is secured by the cylinder 20 with friction.

The guide rods 19 are again raised and lowered hooking the next bag B to stack it onto the preceding bag B. This process is repeated. The bag B is held in place and suspended in air with its top edge facing rearwardly and its bottom edge forwardly.

The heat-bonding and stacking device 17 has, on the upper surface of the upper support wall 17b of the fixed frame 18, two parallel thermal cutting plates 24 of rectangular shape which are disposed vertically and contain a heating source. The thermal cutting plates 24 having sharp thermal cutting edges 24a at their front ends are moved back and forth by a piston 25. The lower portion of each bag holding cylinder 20 has a window 26 facing the thermal cutting edge 24a to receive the cutting edge 24a and allow it to advance near the guide rod 19. Provided at the front end of the upper support wall 17b of the fixed frame 18 are L-shaped drawout members 27 which face the bag holding cylinders 20 and can be moved toward and away from the cylinders 20. The lower end of each bag holding cylinder 20 has a window 28 which receives the vertical portion 27a of the drawout member 27 to allow it to advance near the guide rod 19.

The drawout members 27 have horizontal portions 27b which by a piston 29 move back and forth along the grooves 17b' formed in the support wall 17b.

The heat-bonding and stacking device 17 also includes a pressing plate 30 which is arranged horizontally above the thermal cutting plate 24. The pressing plate 30 has a pair of recesses 31 at the front edge so that when the pressing plate 30 is advanced the recesses 31 can receive the bag holding cylinders 20. The pressing plate 30 is vertically movable at the advanced position. Each thermal cutting plate 24 slides between the pressing plate 30 and the support wall 17b with the upper and lower end surfaces of each cutting plate 24 contacting the pressing plate 30 and the support wall 17b. Each thermal cutting plate 24 is advanced until it is received in the window 26.

When a required number of bags B, for example 50 or 100 bags, are stacked and held by the bag holding cylinders 20, the pressing plate 30 is advanced while the guide rods 19 are being raised, and receives the cylinders 20 in its recesses 31. Next, the pressing plate 30 is lowered to press the bags B stacked on the upper surface of the upper support wall 17b of the fixed frame 18. When the stacked bags B are being pressed, the vertical portions 27a of the drawout members 27 are located within the holes 4 of the bags B and the rear end surface of the stacked bags B faces the thermal cutting edges 24a of the cutting plates 24.

The thermal cutting plates 24 are advanced to press the thermal cutting edges 24a against the rear end surface of the stacked bags B. The thermal cutting plates 24 are gradually advanced melting the rear end surface of the stacked bags B by the heat of the cutting edges 24a until the cutting edges 24a are received in the windows 26 and come near the guide rods 19. In this way grooves 32 are cut in the rear portion of the stacked bags B. Since the inner sides of the cut grooves 32 contact the thermal cutting plates 24 and the bags B are pressed by the pressing plate 30, the stacked bags B are bonded together at the cut grooves 32. When the thermal cutting edges 24a stop, the pressing plate 30 is moved upward and then backward, and remains standing by until a required number of bags are again stacked. The thermal cutting plates 24 are retracted simultaneously with the backward movement of the pressing plate 30. At the same time, the drawout member 27 is moved forward to hook and pull the bonded bags B, which is then transferred by the conveyor (not shown).

A bundle of the stacked bags are further cut and removed of the peripheral portion of the holes 4 to form shopping bags as shown in FIG. 1.

The bag B may be such that only one end of the bag is sealed and the other end is opened. Or it may be a simple bag without any sealing portion.

The present invention has the following advantages. Since the guide rods are inserted into the holes of the bags to hold a number of bags in the correct position and since the heated cutting plates are pressed against the rear end surface of the stacked bags, the temperature of the thermal cutting plates can be prevented from dropping even when 50 or more bags are cut and bonded together. Since the thermal cutting plates are brought into line contact with the bags and the heat-cutting is not directly affected by the condition in which the bags are stacked, the bags can be smoothly bonded together at the correct position. Further, a large number of bags bonded together as one bundle can be cut and removed of the peripheral portion of the holes in one cutting process, thereby enhancing the efficiency of successive processes.

What is claimed is:

1. A method of bundling sheets by heat-adhesion comprising the steps of: making holes through a strip of sheet made of heat-adhesive material; inserting guide rods which are inserted vertically slidably through sheet holding cylinders having vertical grooves, into the holes of the sheet; hooking arrows provided at the top ends of the guide rods and projected from the sides of the guide rods on the peripheral edges of the holes of the sheet; lowering the guide rods so that the arrows are slid downwardly through the grooves of the sheet holding cylinders to force the sheet downwardly along the sheet holding cylinders and to stack the sheets at the predetermined position; and pressing a heated thermal cutter against one end surface of the stacked sheets to bond them together by heat-adhesion.

2. A method of bundling sheets by heat-adhesion comprising the steps of: making holes through a strip of sheet made of heat-adhesive material; inserting guide rods through the holes of the sheet, said guide rods being slidably inserted through sheet holding cylinders having vertical grooves; engaging arrows, which are fitted to the top ends of the guide rods, with the peripheral edge portion of the holes of the sheet, the rear ends of said arrows projecting from the sides of the guide rods and being slidable through the grooves of the sheet holding cylinders; lowering the guide rods to slide the arrows downwardly through the grooves; with the sheet forcing downwardly along the sheet holding cylinders; stacking the sheets successively at the predetermined position; bearing a pressing plate on the top sheet when a required number of sheets are stacked, said pressing plate being movable horizontally as well as vertically; pressing the stacked sheets downwardly along the sheet holding cylinders by the pressing plate; disposing one end surface of the stacked sheets to face a heated thermal cutter; and thereafter pressing the thermal cutter against the end surface of the stacked sheets to bond the stacked sheets together by the heat of the cutter.

3. A method of bundling sheets by heat-adhesion comprising the steps of: making holes through a strip of sheet made of heat-adhesive material; inserting guide rods into the holes of the sheet to stack the sheets at the predetermined position; pressing a heated thermal cutter against one end surface of the stacked sheets to bond them together by heat-adhesion; and drawing out said bonded sheets successively in order to repeat said steps of making holes in sheet, inserting guide rods into the holes, pressing the heated thermal cutter against the stacked sheets continuously and independently.

4. A method of bundling sheets by heat-adhesion as set forth in claim 1, further comprising the steps of: engaging drawout members with the holes of the sheets through windows of the sheet holding cylinders; and drawing out the drawout members with the bonded sheets.

* * * * *